United States Patent [19]
Kolomeitsev

[11] Patent Number: 5,777,416
[45] Date of Patent: Jul. 7, 1998

[54] SWITCHED RELUCTANCE MOTOR WITH LOW MUTUAL INDUCTANCE BETWEEN PHASES

[75] Inventor: Sergei Kolomeitsev, Saline, Mich.

[73] Assignee: Dana Corporation, Toledo, Ohio

[21] Appl. No.: 771,813

[22] Filed: Dec. 23, 1996

[51] Int. Cl.$^6$ .......................... H02K 17/42; H02K 1/00; H02K 3/00
[52] U.S. Cl. .......................... 310/168; 310/182; 310/197
[58] Field of Search .................... 310/168, 166, 310/162, 182, 183, 197

[56] References Cited

U.S. PATENT DOCUMENTS

| | | | |
|---|---|---|---|
| 3,594,595 | 7/1971 | Williams | 310/168 |
| 4,132,932 | 1/1979 | Wanlass | 318/795 |
| 4,475,051 | 10/1984 | Chai et al. | 310/49 |
| 4,883,999 | 11/1989 | Hendershot | 310/254 |
| 4,885,526 | 12/1989 | Szabo | 322/66 |
| 4,906,924 | 3/1990 | Zannis | 324/207.18 |
| 5,015,903 | 5/1991 | Hancock et al. | 310/168 |
| 5,023,546 | 6/1991 | Pawlak et al. | 324/174 |
| 5,023,547 | 6/1991 | Pawlak et al. | 324/171 |
| 5,068,561 | 11/1991 | Lee et al. | 310/178 |
| 5,111,096 | 5/1992 | Horst | 310/168 |
| 5,256,923 | 10/1993 | Bartos et al. | 310/166 |
| 5,376,851 | 12/1994 | Lipo et al. | 310/179 |
| 5,422,525 | 6/1995 | Mansir | 310/179 |

OTHER PUBLICATIONS

A Sliding Mode Observer Based Controller for Switched Reluctance Motor Drives, IEEE 1994 pp. 635–643.
New Modulation Encoding Techniques for Indirect Rotor Position Sensing in Switched Reluctance Motors, IEEE Transactions on Industry applications, vol. 30, No. 1, Jan./Feb. 1994, pp. 85–91.
Rotor Position Sensing in Switched Reluctance Motor Drives by Measuring Mutually Induced Voltages, IEEE Transactions on Industry Application, vol. 30, No. 3, May/Jun. 1994, pp. 665–672.
Elimination of Discrete Position Sensor and Current Sensor in Switched Reluctance Motor Drives, IEEE Transactions on Industry Applications, vol. 28, No. 1, Jan./Feb. 1992, pp. 128–135.
Dual–Decay Converter for Switched Reluctance Motor Drives in Low–Voltage Applications, IEEE Transactions on Power Electronics, vol. 8, No. 2, Apr. 1993, pp. 224–230.

Primary Examiner—Clayton E. LaBalle
Assistant Examiner—Michael J. Wallace, Jr.
Attorney, Agent, or Firm—Dykema Gossett PLLC

[57] ABSTRACT

A switched reluctance electric motor is disclosed that includes a stator portion having a plurality of stator poles. Adjacent stator poles are wound with energizing windings and which are connected in-series to form a respective one of a plurality of motor phases of the electric motor. A rotor portion of the electric motor is also disclosed, and is supported for rotation relative to the stator, and which also includes a plurality of rotor poles. An electrical conductor having first and second ends is disposed about the adjacent stator poles for each one of the plurality of motor phases. The first and second ends of each electrical conductor are shorted together to thereby minimize induced flux linkages in non-energized motor phases when one of the motor phases is energized.

6 Claims, 2 Drawing Sheets

SWITCHED RELUCTANCE MOTOR WITH LOW MUTUAL INDUCTANCE BETWEEN PHASES

BACKGROUND OF THE INVENTION

1. Technical Field

This invention relates generally to switched reluctance motors (SRM), and, more particularly, to an improved construction for such a motor that minimizes mutual inductance between motor phases.

2. Discussion of the Related Art

Switched reluctance (SR) machines, or motors, have been the subject of increased investigation of late due to their many advantages, which makes them uniquely suitable for use in a wide variety of situations. An SR machine operates on the basis of varying reluctance in its several magnetic circuits. In particular, such machines are generally doubly salient motors—that is, teeth or poles appear on both the stator portion and rotor portions thereof. The stator teeth generally have windings associated therewith which form motor phases of the motor. In a common configuration, stator windings on diametrically opposite poles are connected in-series to form one motor phase. An embodiment according to the present invention, to be described in further detail hereinafter, however, adopts a different configuration wherein stator windings of adjacent stator poles are connected together (either in-series, or, in parallel) to form a respective motor phase.

When a stator winding (or windings), as configured above, is energized, the closest rotor pole pair is attracted towards the stator pole pair having the energized stator winding, thus minimizing the reluctance of the magnetic path. By energizing consecutive stator windings (i.e., motor phases) in succession in a cyclical fashion, it is possible to develop torque, and, thus rotation of the rotor portion in either a clockwise, or counter-clockwise direction.

It has been recognized in the art that the inductance of a winding(s) associated with a stator pole(s) varies as a function of rotor position. Specifically, the inductance level varies from a lower level when a particular rotor pole is unaligned with a corresponding stator pole, to an upper or maximum level when the rotor pole and stator pole are in alignment. Thus, when the rotor pole sweeps past a stator pole, the inductance of the stator winding varies through lower-upper-lower inductance levels. The inductance characteristic (as it varies with rotor position) is particularly relevant for the controlled operation of the SR motor. For example, current flowing through a respective motor phase (i.e., including one or more stator windings) must be switched on prior to (i.e., advanced), and maintained during the rising-slope inductance period in order to develop positive torque. Since positive phase current during the decreasing-slope inductance interval produces a negative or breaking torque, the phase current must be switched off before the interval occurs to avoid generating negative torque—which may be undesirable under certain circumstances. Accordingly, rotor position sensing is an integral part of a closed-loop, switched-reluctance motor drive system so as to appropriately control torque generation.

Moreover, since rotor position is such an important part in the controlled operation of a switched reluctance motor, there has been much investigation directed to systems and/or motor configurations for the reliable, accurate and inexpensive detection of rotor position.

As is known, direct methods of detecting rotor position have conventionally used some type of external structure, such as an optical encoder, resolver, external coil, or capacitor to aid in determining rotor position. Such conventional techniques have increased the total size, and cost of switched reluctance motors, due to this added structure. Also, in many instances, reliability of operation is reduced due to the nature of the sensor used.

Such disadvantages has led to the development of various indirect sensing techniques. However, these conventional indirect approaches have also been unsatisfactory for one reason or another. In addition, the conventional construction of such switched reluctance motors has led to particular problems in implementing such indirect position sensing techniques.

For example, one indirect method for rotor position sensing calls for exciting non-energized stator windings in order to determine their inductance, which can then be used, in turn, to determine rotor position. However, it has been observed that certain errors are introduced when monitoring these non-energized phases because of the flux produce by the "active" phase. By way of explanation, in a multiphase switched reluctance motor, two kinds of flux linkages are present: self flux linkage associated with the "active" or main torque producing energized motor phase, and mutual flux linkage, which arises due to coupling between the "active" and non-active motor phases. The production of the main motor torque is based on the use of the self flux linkage produced in the "active" phase. The mutual flux linkages are in comparison, generally fairly small, differing from the overall flux by about 2–5%. Accordingly, such mutual flux linkages generally have little effect on the operation of SR motors that employ conventional rotor position sensing topology (e.g., an external rotor position sensor). However, in the case of a sensorless SR motor (i.e., which uses an "indirect rotor position sensing technique), the situation is different. To keep the use of power to a minimum, current levels through the non-energized motor phases (acting as, in-effect, sensing coils) must be reduced to the greatest extent possible. When the sensing current is very low, a rotor position sensing algorithm becomes sensitive to the current commutation in the "active" stator windings. In particular, an error is induced because currents in the non-energized motor phases are not only a function of rotor position (via the corresponding variation in inductance), but are also a function of the alternating current (AC) component of phase current through the "active" motor phase (via mutual flux linkage). The induced mutual flux linkage thus prevents accurate rotor position sensing, and may result in a degraded SR motor operation.

Accordingly, there is a need to provide an improved electric motor that minimizes or eliminates one or more of the problems as set forth above.

SUMMARY OF THE INVENTION

The present invention provides for an improved electric motor construction that substantially reduces distortions in the sensing of rotor position arising from mutual flux linkage between motor phases. As a result, accuracy and reliability of inductance rotor position sensing in such a sensorless SR motor according to the invention can be greatly increased. An electric motor, according to the invention, is of the type having a plurality of motor phases. The electric motor further comprises a stator including a plurality of stator poles, each having a stator energizing winding provided on a body portion thereof. The energizing windings of adjacent stator poles are connected together to define a respective one of the plurality of motor phases. The motor further includes a rotor supported for rotation relative to the stator, and which includes a plurality of rotor poles. Finally, the improvement occasioned by the present invention pertains to the inclusion of an electrical conductor disposed about the adjacent stator poles for each one of the plurality of motor phases. Each conductor has respective first and second ends which are shorted together to thereby minimize induced mutual flux linkage in non-energized (i.e. non-active) motor phases when one of the motor phases is energized (i.e., "active").

In a preferred embodiment, the electrical conductor comprises a coil having a plurality of turns.

These and other features and objects of this invention will become apparent to one of ordinary skill in the art from the following detailed description and the accompanying drawings illustrating features of this invention by way of example (but not by way of limitation).

DETAILED DESCRIPTION OF THE PREFERRED EMBODIMENTS

Figure 1:
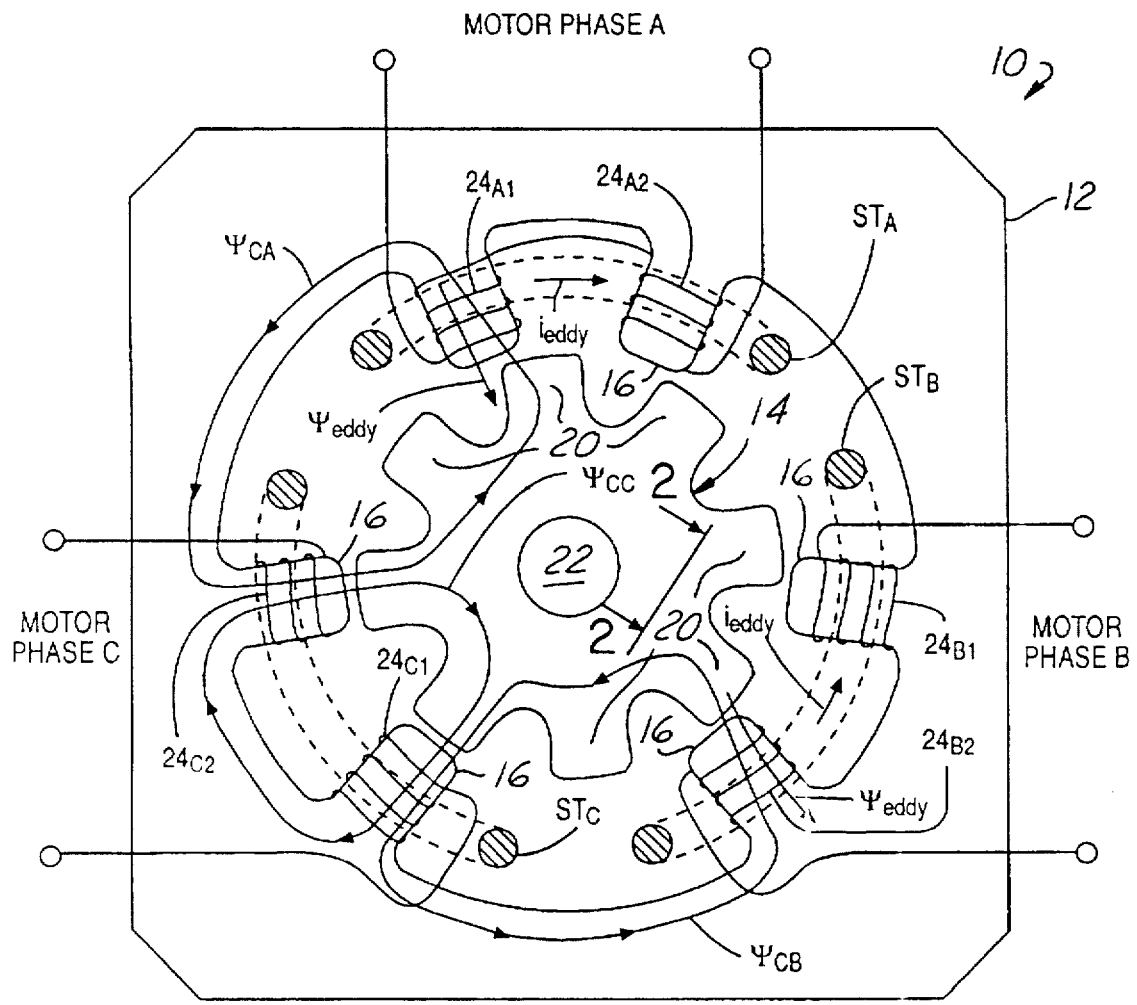
FIG. 1 is a diagrammatic, cross-sectional view of a switched reluctance electric motor in accordance with the present invention.

Referring now to the drawings wherein like reference numerals are used to identify identical components in the various views. FIG. 1 shows, in a cross-sectional view, the major mechanical components of a switched reluctance (SR) electric motor 10, which includes a stator assembly 12, and a rotor assembly 14.

Stator assembly 12 may comprise a plurality of laminations (not shown). Such laminations may be formed using a magnetically permeable material, such as iron.

Stator assembly 12 includes a plurality of radially, inwardly-extending poles 16, each of which has a body portion thereof. Rotor assembly 14 includes a body portion 18 have a plurality of poles 20 disposed thereon, and, a shaft portion 22.

Stator 12, as is known, may be generally hollow and cylindrical in nature. The plurality of poles 16 are formed on stator 12 and extend through the length thereof. Poles 16 are preferably provided in adjacent pairs. It should be appreciated, however, that although six stator poles 16 are illustrated, a greater or lesser number may be provided in any particular configuration.

Each one of poles 16 may have a generally rectangular shaped body portion, when taken in the cross-section (FIG. 1). The radially innermost surfaces of poles 16 are slightly curved so as to define an inner diameter representing a bore, which is adapted in size to receive rotor assembly 14.

Rotor assembly 14, when assembled into stator 12, is coaxially supported therein for relative rotational movement by conventional means. For the purposes of description only, rotor assembly 14 may be supported by conventional bearings (not illustrated) mounted in conventional end housings (not shown) secured to the longitudinal ends of stator assembly 12. The body portion of rotor assembly 14 may be secured to shaft 22 for rotation therewith. For example, body portion 18 may be secured to shaft 22 by means of a spline (not shown), or other conventional means well-known in the art. Thus, shaft 22, and rotor body 18, including poles 20, rotate together as a unit.

Each one of the poles 20 that are formed on rotor body 18 extend radially outwardly from the outer surface thereof, and are formed having a generally rectangular shape, as shown in the crosssection view of FIG. 1. Rotor poles 20 extend longitudinally throughout the entire length of the outer surface of rotor body 18. The radially outermost surface of rotor poles 20 are curved so as to define an outer diameter, adapted in size to be received within the inner diameter of stator assembly 12. That is, the outer diameter formed by rotor poles 20 is slightly smaller than the inner diameter defined by the radially innermost curved surfaces of stator poles 16. Rotor poles 20 are preferably provided in diametrically opposite pairs. Eight (8) rotor poles 20 are provided in the illustrated embodiment. However, it should be appreciated that a greater or lesser number of rotor poles 20 may be provided for any particular configuration. For SR motors, in general, the number of rotor poles 20 differs from the number of stator poles 16, as is well-known. Rotor body 18, including poles 20, may be formed from a magnetically permeable material, such as iron.

With continued reference to FIG. 1, stator poles 16 occur in adjacent pairs, three pairs in number and corresponding to the three motor phases, namely, motor phase A, motor phase B, and motor phase C. Stator energizing windings $24_i$ of adjacent stator poles are connected, in one configuration, in series and are selectively connected, by way of commutation circuitry, between power supply rails to initiate torque producing current therethrough (i.e., the "active" phase). It should also be appreciated that these energizing windings may also be connected in parallel. The energizing windings $24_{A1}$ and $24_{A2}$ wound on adjacent stator poles 16 are referred to as a "motor phase A" of SR motor 10. In the illustrated embodiment, SR motor 10 also includes a motor phase B, and a motor phase C. Each of these three motor phases may be energized individually, which, when done in a controlled manner, as is well known in the art, provides for rotation of rotor 14. Although a 3-phase motor is described and illustrated, any multi-phase SR motor is contemplated as falling within the spirit and scope of this invention. For example, 4-phase motors are contemplated as within the invention described herein.

In particular, motor phase A is defined (as mentioned above) by winding $24_{A1}$, and winding $24_{A2}$, connected in-series. Likewise, motor phase B is defined by winding $24_{B1}$, and winding $24_{B2}$, connected inseries. Motor phase C, similarly, is defined by winding $24_{C1}$, and winding $24_{C2}$, connected in-series.

FIG. 1 is illustrated as having motor phase C as the "active" motor phase, or, in other words, the "energized" motor phase. This energization results in the generation of self-flux linkage $\psi_{CC}$, which, as is known, flows in a closed-loop path. Thus, as illustrated, flux lines $\psi_{CC}$, leave the stator pole 16 associated with winding $24_{C2}$, enter rotor body 18, and return through the stator pole 16 associated with winding $24_{C1}$, to close the loop.

Mutual flux linkages $\psi_{CB}$, and $\psi_{CA}$, are induced by the energization of motor phase C. These mutual flux linkages are the result of, and correspond to, the AC component of the current through the phase windings associated with the "active" motor phase—here, motor phase C. If uncorrected, the induced, mutual flux linkages $\psi_{CB}$, $\psi_{CA}$ will introduce an error when the non-"active" motor phases (in the illustration, motor phase A, and motor phase B) are excited to determine the phase inductance (and thus rotor position). The error results since the current through the windings associated with the non-"active" motor phases being monitored is not only a function of rotor position, but is also a function of the AC component of current through stator windings of the "active" motor phase—in the illustration, motor phase C.

To overcome this error, the present invention provides for a respective electrical conductor, such as shorted turns $ST_A$, $ST_B$, and $ST_C$, to be disposed about the adjacent stator poles for each one of the plurality of motor phases. In particular, each shorted turn $ST_A$, $ST_B$, and $ST_C$, has associated therewith a first and second end which are shorted together.

Figure 2:
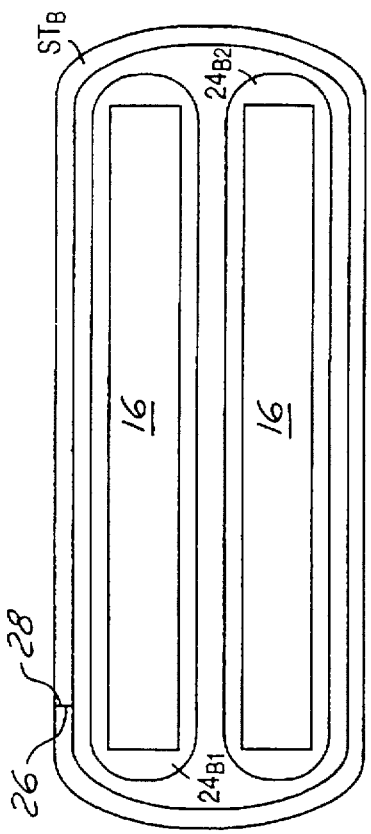
FIG. 2 is a top view taken in the direction of arrows 2—2 shown in FIG. 1, illustrating the orientation of shorted turn $ST_B$.

FIG. 2 shows the orientation of shorted turn $ST_B$ as viewed in the direction of arrows 2—2 in FIG. 1. Shorted turn $ST_B$, includes first end 26, and second end 28 that are shorted or electrically connected together. Shorted turn $ST_B$ extends generally, longitudinally around stator poles 16 associated with windings $24_{B1}$, and $24_{B2}$. It should be understood that, in the illustrative embodiment, shorted turns $ST_A$, and $ST_C$ are similarly disposed about adjacent stator poles 16 associated with corresponding motor phase A and C, respectively. Although a single turn is shown in the illustrated embodiment, embodiments having up to three turns have been found satisfactory.

In operation, it should be understood that shorted turns $ST_A$, $ST_B$, and $ST_C$ have zero mutual coupling, with respect to its respective, corresponding pair of stator windings $24_i$. That is, for example, shorted turn $ST_C$ has zero mutual coupling with respect to windings $24_{C1}$, and $24_{C2}$, shorted turn $ST_B$, has zero mutual coupling with respect to windings $24_{B1}$, and $24_{B2}$, and shorted turn $ST_C$ has zero mutual coupling with respect to windings $24_{C1}$, and $24_{C2}$. Therefore, in the illustrated embodiment where motor phase C is "active", any change in flux $\psi_{CC}$ will not induce an eddy current in $ST_C$. However, coupling of shorted turns $ST_A$, and $ST_B$ with the flux of "active" phase C is not zero. Therefore, a respective eddy current indicated as $i_{EDDY}$ is induced in shorted turns $ST_A$, and $ST_B$. The eddy current $i_{EDDY}$, in turn, gives rise to flux $\psi_{EDDY}$. This is shown in FIG. 1 as the arrow in stator poles 16 associated with windings $24_{B2}$, and $24_{A1}$, respectively. The eddy flux linkage $\psi_{EDDY}$ substantially counteracts the induced, mutual flux linkages $\psi_{CA}$, and $\psi_{CB}$. Therefore, the net flux linkage is substantially reduced or eliminated in the non-energized (i.e., non-"active") motor phases. Thus, when the non-"active" motor phases are excited in order to determine inductance (by measuring the sensing current flowing therethrough and upon which inductance is determined), such inductance is substantially only the function of rotor position, and is not variable as a function of the AC component of current flowing in the stator windings associated with the "active" motor phase.

It should be appreciated, that the foregoing exemplary description pertains to the situation where motor phase C is the "active" motor phase, while motor phase A, and motor phase B are the non-"active" motor phases. Thus, it should be understood that each motor phase, in succession, will become the "active" motor phase according to a known control strategy, while the remaining motor phases become the non-"active" motor phases. In addition, some control strategies specify that two motor phases be "active" simultaneously, at least for an overlap interval.

Figure 3:
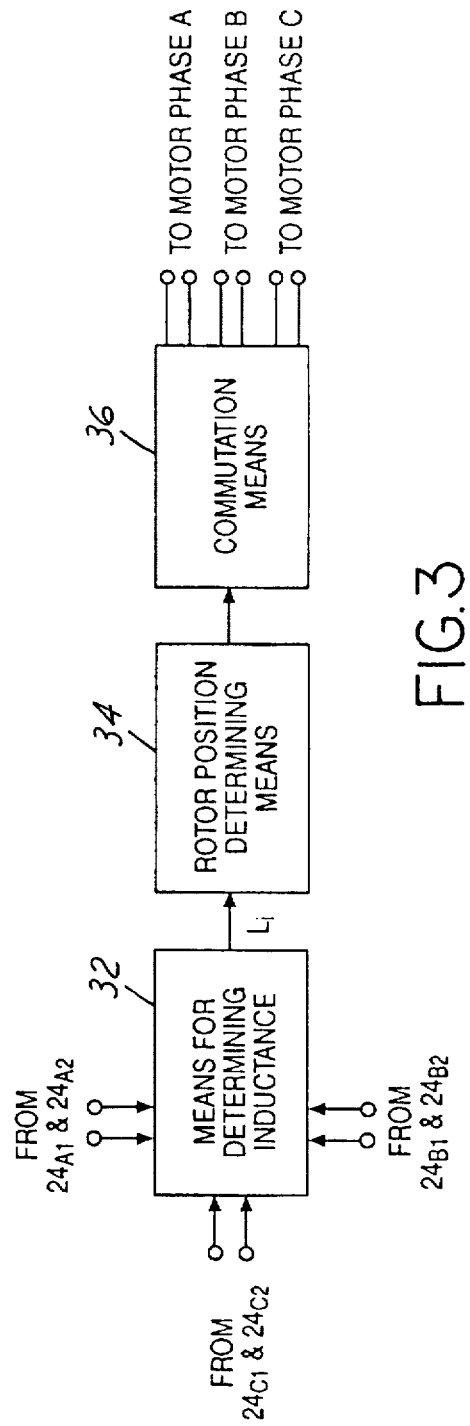
FIG. 3 is a simplified, schematic and block diagram view of circuitry that may be employed in connection with the preferred electric motor embodiment illustrated in FIG. 1.

Referring now to FIG. 3, a system for using the inventive electric motor structure shown in FIG. 1 is illustrated. The system includes means, such as circuit 32, for determining inductance of one or more of the non-"active" motor phases (which comprise, in the illustrated embodiment, a pair of windings $24_i$ connected in-series), means, such as circuit 34, responsive to the inductance determining means 32, for determining a position of rotor assembly 14, and means, such as circuit 36, for commutating one or more of the motor phases of SR motor 10.

As alluded to above, circuit 32 is connected to one or more of the stator windings associated with the plurality of motor phases, and is provided for generating one or more inductance signals $L_N$ that are indicative of the inductance of the respectively excited (i.e., sensed) stator windings. The structure and technique of determining inductance is well-known and conventional in the art.

Circuit 34 is provided for processing the inductance information signals $L_N$, and for providing a signal that is representative of the rotational position of rotor assembly 14, relative to stator 12. Basic techniques, systems and methods for determining rotor position from one or more inductance indicative signals are well-known and conventional in the art.

Commutation means 36 is responsive to the above-mentioned rotor position signal for commutating the various motor phases, and which includes the means for energizing one or more of the stator energizing windings $14_i$ associated with the motor phases. As mentioned above, an "active" motor phase means that the stator windings $24_i$ associated therewith are energized by being connected between power supply rails so that a torque-producing current flows therethrough.

An electric motor in accordance with this invention includes a shorted turn comprising one or more loops thereof, disposed about adjacent stator poles which define the respective motor phases. The inventive construction greatly reduces the distortions in the non-"active" stator windings (i.e., acting as sensing coils) from mutual inductance between motor phases. Reducing these distortions has the advantage of greatly increasing the accuracy and reliability of inductance rotor position sensing in sensorless SR motors. Improved rotor position sensing leads to more efficient operation of such SR motors.

The preceding description is exemplary rather than limiting in nature. A preferred embodiment of this invention has been disclosed to enable one skilled in the art to practice the invention. Variations and modifications are possible without departing from the purview and spirit of this invention; the scope of which is limited only by the appended claims.

I claim:

1. An electric motor having a plurality of motor phases comprising:
   a stator including a plurality of stator poles each having a stator energizing winding provided on a body portion thereof wherein energizing windings of adjacent stator poles are connected to define a respective one of said plurality of motor phases;
   a rotor supported for rotation relative to said stator, and including a plurality of rotor poles; and,
   an electrical conductor having first and second ends disposed about said adjacent stator poles for each one of said plurality of motor phases wherein respective first and second ends of each electrical conductor are shorted together to thereby minimize induced flux linkage in non-energized motor phases when at least one of said motor phases is energized.

2. The electric motor of claim 1 further including means for determining an inductance value of said windings associated with selected ones of said non-energized motor phases.

3. The electric motor of claim 2 wherein said inductance determining means is further operative to generate a rotor position indicative signal providing an indication of a position of said rotor.

4. The electric motor of claim 1 wherein said electrical conductor comprises a flux linkage reducing coil having a plurality of turns.

5. A switched reluctance motor comprising:

a stator including a plurality of stator poles each having a stator energizing winding provided on a body portion thereof wherein energizing windings of adjacent stator poles are connected to define a respective one of a plurality of motor phases;

a rotor supported for rotation relative to said stator, and including a plurality of rotor poles; and, an electrical conductor having first and second ends disposed about said adjacent stator poles for each one of said plurality of motor phases wherein respective first and second ends of each electrical conductor are shorted together to thereby minimize induced flux linkage in non-energized motor phases when at least one of said motor phases is energized; and, means for determining an inductance of selected ones of said non-energized motor phases to thereby provide an indication of a position of said rotor.

6. A switched reluctance motor comprising:

a stator including a plurality of stator poles each having a stator energizing winding provided on a body portion thereof wherein energizing windings of adjacent stator poles are connected to define a respective one of said plurality of motor phases;

a rotor supported for rotation relative to said stator, and including a plurality of rotor poles;

an electrical conductor having first and second ends disposed about said adjacent stator poles for each one of said plurality of motor phases wherein respective first and second ends of each electrical conductor are shorted together to thereby minimize induced flux linkage in non-energized motor phases when at least one of said motor phases is energized, wherein each energized motor phase has associated therewith respective flux linked in a closed-loop path, said flux of said energized motor phase leaving one of said adjacent stator poles associated with the energized motor phase, entering said rotor, and returning through the other one of said adjacent stator poles associated with said energized motor phase, said electrical conductor being disposed about said adjacent stator poles to enclose said closed-loop path; and, means for determining an inductance of selected ones of said non-energized motor phases to thereby provide an indication of a position of said rotor.

* * * * *